United States Patent [19]

Grigorova et al.

[11] Patent Number: 5,759,949
[45] Date of Patent: Jun. 2, 1998

[54] SUPPORTED COLD-COMPLEX OXIDATION CATALYST

[76] Inventors: Bojidara Grigorova, 52 Morsim Road, Hyde Park Sandton, Transvaal; Atanas Palazov, 15 Pitchford Road, Northcliff, Johannesburg, Transvaal; John Mellor, 22 Bedford Avenue, Craighall Park, Johannesburg, Transvaal; James Anthony Jude Tumilty, 7B First Avenue, Rivonia, Sandton, Transvaal; Anthony Harold Gafin, 64 Fir Road, Glenhazel, Johannesburg Transvaal, all of South Africa

[21] Appl. No.: 538,177

[22] Filed: Aug. 23, 1995

Related U.S. Application Data

[63] Continuation of Ser. No. 197,132, Feb. 16, 1994, abandoned.

[30] Foreign Application Priority Data

| Feb. 18, 1993 | [ZA] | South Africa | 93/1135 |
| Sep. 1, 1993 | [ZA] | South Africa | 93/6439 |
| Jan. 25, 1994 | [ZA] | South Africa | 94/0503 |

[51] Int. Cl.$^6$ ........................ B01J 23/52
[52] U.S. Cl. ............ 502/330; 502/344; 502/415; 502/355; 502/348; 502/317; 502/320; 502/327
[58] Field of Search .............. 502/330, 344, 502/415, 326, 355, 348, 317, 320, 327

[56] References Cited

U.S. PATENT DOCUMENTS

| 3,459,657 | 8/1969 | Krunig et al. | |
| 3,839,225 | 10/1974 | Acres | 252/432 |
| 3,878,131 | 4/1975 | Hayes | 252/466 |
| 3,909,455 | 9/1975 | Rainer et al. | 502/260 |
| 3,928,238 | 12/1975 | Koberstein et al. | 252/465 |
| 4,839,327 | 6/1989 | Haruta et al. | 502/330 |
| 4,880,763 | 11/1989 | Eri et al. | 502/302 |
| 4,880,764 | 11/1989 | Imai et al. | 502/326 |
| 4,957,896 | 9/1990 | Matsumoto et al. | 502/304 |
| 5,068,217 | 11/1991 | Falke et al. | |
| 5,112,787 | 5/1992 | Falke et al. | 502/330 |
| 5,145,822 | 9/1992 | Falke et al. | |
| 5,502,019 | 3/1996 | Augustine et al. | 502/314 |

FOREIGN PATENT DOCUMENTS

| 0 395 856 A1 | 11/1990 | European Pat. Off. |
| 0 461 452 A1 | 12/1991 | European Pat. Off. |
| 39 14 294 | 10/1990 | Germany .......... B01J 23/89 |
| 1 109 726 | 4/1968 | United Kingdom. |

OTHER PUBLICATIONS

H. Kageyama et al., "XAFS Studies of Ultra–Fine Gold Catalysts Supported on Hematite Prepared from Co–precipitated Precursors", Physica B158 (1983–184. no month.

M. Haruta et al., "Mechanistic Studies of CO Oxidation of Highly Dispersed Gold Catalysts for use in Room–Temperature Air Purification", proceedings of the 10th International Congress on Catalysis, Jul. 19–24, 1992 Budapest Hungary, pp. 2657 to 2660.

International Search Report; PCT/GB94/00321; Jun. 7, 1994; A. Eijkenboom.

*Primary Examiner*—Glenn Caldarola
*Assistant Examiner*—Nadine Preisch
*Attorney, Agent, or Firm*—Fish & Richardson P.C.

[57] ABSTRACT

A catalyst for use in an oxidation reaction comprises a porous alumina support having captured thereon a complex comprising gold, a transition metal selected from cobalt and manganese, and the alumina, the concentration of gold on the support being less than 2 percent by mass of the catalyst, and the atomic ratio of gold to transition metal being in the range 1:30 to 1:200. The oxidation reaction may be the oxidation of carbon monoxide or a hydrocarbon.

6 Claims, 2 Drawing Sheets

SUPPORTED COLD-COMPLEX OXIDATION CATALYST

This is a continuation of application Ser. No. 08/197,132, filed Feb. 16, 1994, now abandoned.

BACKGROUND OF THE INVENTION

This invention relates to a catalyst, particularly a catalyst for use in the oxidation of carbon monoxide and hydrocarbons.

The reduction of pollution and the protection of the environment is one of the major issues facing the world today. The internal combustion engine contributes significantly to the pollution levels in the atmosphere. Noxious exhaust gases issue from internal combustion engines and many countries of the world now have laws directed at reducing the emission of such noxious gases. A reduction in the emission of noxious gases from internal combustion engines may be achieved by the use of suitable catalysts. By way of example, one of the noxious exhaust gases of an internal combustion engine is carbon monoxide and platinum or palladium may be used to catalyse the oxidation of carbon monoxide to carbon dioxide. Platinum functions satisfactorily in dry conditions and at high temperature, e.g. 300° C. or higher. However, in moist conditions and at low temperature the effectiveness of platinum in catalysing the oxidation of carbon monoxide is significantly reduced.

Gold-containing catalysts are also known in the literature. For example, German Patent No. 3914294 describes such a catalyst in which gold is captured on a iron oxide-containing support. The support may be a material such as alumina or aluminosilicate. The support is typically impregnated with the iron oxide and the gold and thereafter calcined at a temperature of at least 200° C. It is said that such catalysts are effective in catalysing carbon monoxide oxidation at temperatures below 50° C. The Applicant has found that catalysts of this general type achieve only poor conversion of carbon monoxide to carbon dioxide and are unstable.

Gold-containing catalysts produced by co-precipitation are also described in the literature. These catalysts consist of gold supported on an oxide such as cobalt oxide, iron oxide, titanium dioxide or the like. Such catalysts have also been found to have poor carbon monoxide oxidation catalytic properties and poor stability. Examples of publications which describe such catalysts are:

1. H. Kageyama et al, "XAFS Studies of Ultra-Fine Gold Catalysts Supported on Hematite Prepared from Co-precipitated Precursors", Physica B158 (1989) 183–184;

2. M. Haruta et al, "Mechanistic Studies of CO Oxidation on Highly Dispersed Gold Catalysts for use in Room-Temperature Air Purification", proceedings of the 10th International Congress on Catalysis, 19–24 Jul. 1992, Budapest, Hungary, pages 2657 to 2660.

The catalysts described above may be produced using various methods. For example, they are frequently made by co-precipitating the two metals from solutions containing the metals. Alternatively, the support material may be impregnated with solutions of the metals. In both instances, the catalyst is activated by heating it at a temperature of the order of 200° C. or higher. It is to be noted in this regard that the art has generally recommended lower activation temperatures to avoid sintering of the metal. The activation may take place in an oxidising atmosphere.

SUMMARY OF THE INVENTION

According to the present invention, a catalyst for use in an oxidation reaction comprises a porous alumina support having captured thereon a complex comprising gold, a transition metal selected from cobalt and manganese, and the alumina, the concentration of gold on the support being less than 2 percent by mass of the catalyst, and the atomic ratio of gold to transition metal being in the range 1:30 to 1:200.

The complex of gold, transition metal and alumina will contain chemical bonding and possibly some physical bonding. The transition metal will generally be present in the form of an oxide, at least in part. The complex is a cluster which, it is believed, is chemically bonded to a support. A large number of such clusters will be provided on the porous alumina support. When the transition metal is cobalt, it is believed that oxidised cobalt such as $Co_3O_4$, and a spinel between the cobalt and the alumina are formed, and that gold atoms or particles are in intimate contact with, and believed to be chemically associated with the spinel and the oxidised cobalt The catalysts of the invention have been found to be effective in the oxidation of carbon monoxide and more so than similar catalysts of the prior art wherein the transition metal is other than cobalt or manganese. The catalysts have the ability to catalyse the oxidation of carbon monoxide to carbon dioxide at temperatures below 50° C. and also at higher temperatures. Thus, the catalyst of the invention has application in the exhaust systems of motor vehicles, gas safety masks, the purification of air in mines and underground operations, the purification of various industrial effluent gases and the re-cycling of carbon dioxide in lasers.

The catalysts of the invention have also been found to be effective in catalysing the oxidation of a hydrocarbon, for example, to water and carbon dioxide. Such oxidation occurs at higher temperatures, e.g. at least 300° C. As such, the catalysts may have use in fuel cells.

Further according to the invention, a method of oxidising a reactant includes the steps of contacting the reactant with a source of oxygen in the presence of a catalyst described above. The source of oxygen will typically be pure oxygen, air or oxygen mixed with another gas such as nitrogen.

DESCRIPTION OF EMBODIMENTS

Figure 1:
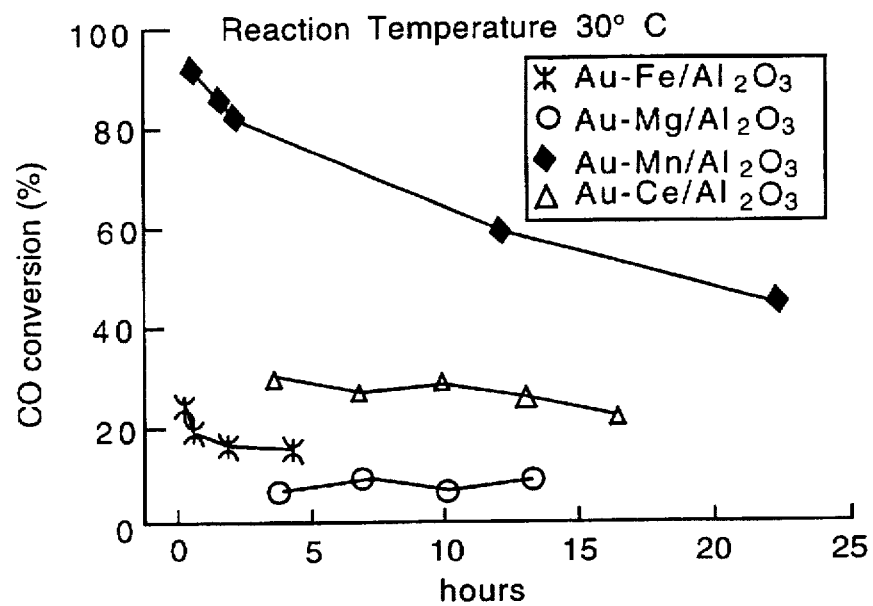
FIGS. 1 to 4 illustrate graphically the percent CO conversion, i.e. oxidation of CO with oxygen to carbon dioxide, in the presence of various catalyst systems.

It is important that the support is a porous alumina support. Other oxide supports which have been used in the prior art such as silica and titania have been found not to be sufficiently effective in producing a suitable catalyst. The alumina will have a large surface area, typically 80 to 400 $m^2/g$. The alumina may take any suitable form such as a monolith or pellets, extrudates, rings or pearls.

Essential to the catalyst is the presence of gold which is in a low concentration, i.e. less than 2 percent by mass of the catalyst. Indeed, effective catalytic activity has been achieved with a gold concentration as low as 0.1 percent by mass of the catalyst. Preferably, the gold concentration is of the order of 0.1 to 0.5 percent by mass of the catalyst. Concentrations of gold higher than 2 percent by mass of the catalyst lead to expensive catalysts of lesser stability.

The atomic ratio of gold to transition metal is in the range 1:30 to 1:200, preferably in the range 1:30 to 1:80. A particularly suitable atomic ratio of gold to transition metal is of the order of 1:60.

The gold and transition metal may be captured on the porous alumina support by impregnating the support with solutions of the metals. The solutions will generally have acidic pH and such as to avoid any precipitation or co-precipitation of the metals before impregnation. Higher pH's can also be tolerated. The solvent of the solution or solutions will preferably be water, but organic solvents such as alcohols and ethers and mixtures of organic solvents with water, may also be used.

The impregnation of the porous alumina support may take place simultaneously or sequentially. It is preferred that the metals are captured on the support sequentially.

In one method of capturing the metals on the porous support, the support is impregnated with a solution of gold or transition metal, dried, impregnated with a solution of the other metal, dried, and heat treated in an oxidising atmosphere to a temperature exceeding 300° C.

In another and preferred method, the porous support is impregnated with a solution of the transition metal, dried, the dried product exposed to a reducing atmosphere such as hydrogen or carbon monoxide at a temperature exceeding 300° C., typically 500° C., and thereafter optionally exposed to an oxidising atmosphere, the thus treated product impregnated with a solution of gold, dried, and the dried product heat treated in an oxidising atmosphere exceeding 300° C.

In the above methods, heat treatment of the impregnated product in an oxidising atmosphere has the effect of activating the catalyst. The oxidising atmosphere will typically be air or oxygen mixed with another gas and is preferably pure or substantially pure oxygen. The temperature of the heat treatment will typically be in the range 300° to 700° C. and preferably in the range 400° to 600° C. A temperature of 500° C. has been found particularly suitable for the heat treatment.

The heat treatment in oxidising atmosphere at a temperature exceeding 300° C. may be preceded by heat treatment in the presence of carbon monoxide or other reductant at the same or similar temperature.

The gold solution will typically be a tetrachloroauric acid or ammonium tetrachloroaurate solution. The concentration of the gold compound in the solution will generally not exceed 4 to 5 molar.

The transition metal solution will typically be a nitrate solution. Although solutions of chlorides and sulphates may be used, they may poison the catalyst. The concentration of the transition metal compound in the solution will generally not exceed 4 to 5 molar.

The following examples illustrate methods of making the catalysts of the invention.

EXAMPLE 1

An aliquot of porous alumina support material (3 g) was dried at 120° C. for two hours. The sample was placed in a receptacle forming part of a vacuum system. Following evacuation with a mechanical pump for 1.5 minutes, the support material was placed in the impregnating solution (4.5 ml of cobalt nitrate solution, 2.7 mol $l^{-1}$). The vacuum pump was left running for a further two minutes. After venting the system to the atmosphere the excess solution was removed and the support material was dried for 14 hours at 120° C.

The product of Step 1 was impregnated with an aqueous gold solution following a similar procedure to that employed when impregnating with the cobalt. The dried product of support material containing the cobalt compound was introduced to 4.5 ml tetrachloroauric acid solution (0.077 mol $l^{-1}$ pH 1.3) under reduced pressure as achieved by drawing a vacuum with a mechanical pump for about 1.5 minutes. Within about 30 seconds after introducing the support material to the gold solution, the system was vented to the atmosphere and the excess solution was removed. The sample was dried in air at 120° C. for about 12 hours.

Activation was achieved by heating the impregnated support in a 30 ml/minute flow of pure oxygen to a temperature of 500° C. and this temperature maintained for about 20 to 30 minutes.

EXAMPLE 2

Porous alumina support material (1–4 g) was accurately weighed and dried in an oven at 120° C. for a minimum of 2 hours. The dry material was impregnated with a cobalt nitrate solution in vacuo, as in Example 1.

The cobalt impregnated alumina support material was dried for a minimum of 24 hours at 120° C., causing some decomposition of the nitrate. Following drying, the material was heated at 500° C. under flowing hydrogen (30 ml/min) and held at this temperature for 20 minutes. Following this, the material was allowed to cool in flowing hydrogen to room temperature. The material was thereafter treated with oxygen or other oxidising atmosphere at a temperature of less than 40° C., i.e. 25° C. to 35° C., for a period of 20 to 30 minutes.

The thus treated product was impregnated with a gold solution typically a tetrachloroauric acid or ammonium tetrachloroaurate solution, as in Example 1.

The impregnated support material was activated by heating it in a 30 ml/minute flow of pure oxygen to a temperature of 500° C. This temperature was maintained for a period of 20 minutes.

X-ray diffraction studies of the catalyst produced by Example 2 showed that $Co_3O_4$ and a $CoAl_2O_4$ spinel was formed on the alumina with gold atoms or small gold particles in intimate contact therewith.

EXAMPLE 3

A gold-manganese based catalyst was produced in the following manner. 1 g of porous alumina pellets was heat treated for one hour at 400° C. in an atmosphere of substantially pure oxygen. 2 ml of a 1.5M manganese nitrate solution was added to 1 g of the heat-treated alumina pellets. Contact was maintained for one hour during which time the manganese nitrate impregnated the pellets. The manganese nitrate impregnated pellets were dried at 120° C. The manganese impregnation and subsequent drying procedure was repeated.

The dried manganese impregnated pellets were contacted with 2 ml of a 1 weight percent tetrachloroauric acid solution to allow the tetrachloroauric acid to impregnate the pellets. The thus impregnated pellets were dried at 120° C. and thereafter heat treated in the reactor in substantially pure oxygen at a temperature above 400° C. for 20 to 30 minutes.

The catalyst produced consisted of alumina pellets having captured or absorbed thereon about 0.5 weight percent of gold. Gold-manganese clusters are believed to have formed. The gold:manganese weight ratio was 1:58. The catalyst was found to catalyse effectively the oxidation of carbon monoxide to carbon dioxide at about room temperature, i.e. at about 27° C.

EXAMPLE 4

Gold-manganese catalysts of varying gold and manganese content were prepared by the sequential impregnation of alumina with solutions of manganese nitrate and tetrachloroauric acid.

Gold-manganese samples: Sequential impregnation

Sample 1 0.25 Au—Mn/$Al_2O_3$ Au:Mn=1:35
Sample 2 0.26 Au—Mn/$Al_2O_3$ Au:Mn=1:58
Sample 3 0.23 Au—Mn/$Al_2O_3$ Au:Mn=1:70
Sample 4 0.23 Au—Mn/$Al_2O_3$ Au:Mn=1:125

1 g of porous alumina pellets was air dried at 120° C. for 20 minutes prior to impregnation. Initially the pellets were soaked in 2 ml of 1.0M $Mn(NO_3)_2.4H_2O$ solution for 60 minutes. Typically 0.5 ml of Mn solution was absorbed into the pellets. The Mn content of the catalyst was consistent with the volume of solution absorbed. The alumina pellets were air dried at 120° C. and the Mn impregnation procedure was repeated until the required concentration of Mn was obtained. Samples 1 to 3 were soaked once in the manganese solution, whilst sample 4 was soaked twice.

Subsequent to Mn impregnation, the pellets were soaked in 2 ml of 0.025M $HAuCl_4$ solution for 60 minutes. Typically 0.5 ml of Au solution was absorbed into the pellets. The catalyst Au content was consistent with the volume of solution added. In all cases, a single impregnation of $HAuCl_4$ was sufficient to achieve a gold mass of about 0.2 percent.

Gold-manganese samples: Simultaneous impregnation

Sample 5 0.61 Au—Mn/$Al_2O_3$ Au:Mn 1:59

1 g of alumina pellets was air dried at 120° C. and soaked in 2 ml of a mixed gold and manganese solution (0.0126M $HAuCl_4.3H_2O+0.751M$ $Mn(NO_3)_2.4H_2O$). After soaking for 60 minutes, the catalyst was air dried at 120° C. for one hour. The soaking impregnation procedure was repeated i.e. the alumina pellets were soaked in 2 ml of fresh solution for another 60 minutes. The residue solution from the first impregnation was colourless after the 60 minutes. Approximately 0.5 ml of mixed solution was absorbed in each case. The gold and manganese content from the first mixed solution aliquot was completely absorbed into the pellets. The catalyst was air dried at 120° C. for 16 hours.

Sample 6 0.57 Au—Mn/$Al_2O_3$ Au:Mn 1:59

The procedure was the same as for Sample 5, save that the alumina pellets were impregnated 5 times. In each case the alumina pellets were soaked in 2 ml of mixed solution which had been diluted four fold.

Sample 7 0.96 Au—Mn/$Al_2O_3$ calcined Au:Mn=1:59

The procedure was the same as that for Sample 5, save that alumina pellets were calcined in air at 600° C. overnight, prior to impregnation. The support was impregnated twice. In each case the alumina pellets were soaked in 2 ml of the mixed solution. The residue solution from the first impregnation was colourless after soaking for 60 minutes. The second residue solution was colourless after soaking the pellets overnight.

In all the above samples, the catalysts were each activated by heat treatment in oxygen at a temperature of 500° C. for 20 to 30 minutes.

CATALYST ACTIVITY AND STABILITY TESTS

The catalysts of the invention and other catalysts were tested for CO oxidation catalytic activity in a catalyst testing apparatus. The apparatus consisted of three fixed-bed laboratory micro-reactors, two constructed from stainless steel and one from quartz glass. The design enabled simultaneous testing of several samples under identical experimental conditions. Gases were supplied to the reactors through a manifold which incorporated flow meters and fine control needle valves for regulating flow rates. A reactant mixture of the following composition was used: CO 1%; oxygen 0.5 to 25%; balance to 100% nitrogen. In all cases 1 g of catalyst was used. Gas analysis was achieved by on-line gas chromatography.

A gold-manganese/aluminium oxide catalyst produced by Example 3 above was compared in CO oxidation catalytic activity with similar catalysts produced by the same method, save that the transition metal used was not manganese but iron, magnesium and cerium. The activity achieved using each catalyst is illustrated graphically by FIG. 1. It will be noted from this figure that the gold-manganese catalyst was significantly superior to the other three catalysts under the conditions used.

Figure 2:
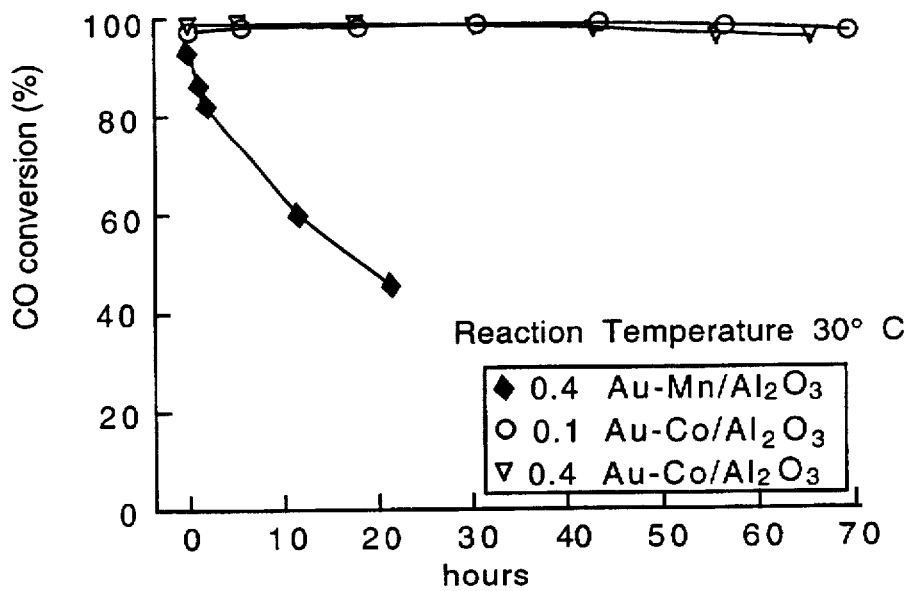

In a similar test, the catalytic activity of a gold-manganese/aluminium oxide catalyst was compared with that of a gold-cobalt/aluminium oxide catalyst-produced by the method of Example 1. Two gold-cobalt catalysts were used in the experiment, one containing 0.1 percent by mass gold and the other 0.4 percent by mass gold. The results are shown graphically on FIG. 2. It will be noted that the gold-cobalt/aluminium oxide catalyst achieved at least 98 percent CO conversion for at least 70 hours under the conditions used. In contrast, for the gold-manganese/ aluminium oxide catalyst the CO conversion dropped to 40 percent after about 25 hours.

Figure 3:
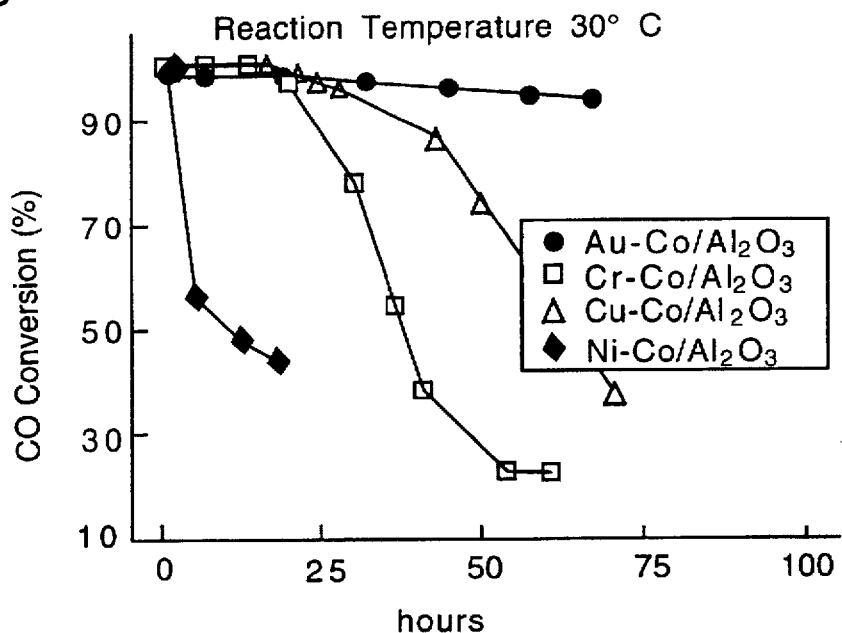

In another set of experiments, a gold-cobalt/aluminium oxide catalyst was compared with similar catalysts, replacing the gold by chromium, copper and nickel. The activity of the gold-cobalt/aluminium oxide catalyst was far superior to the other three catalysts in carbon monoxide oxidation, as can be seen graphically by FIG. 3.

Figure 4:
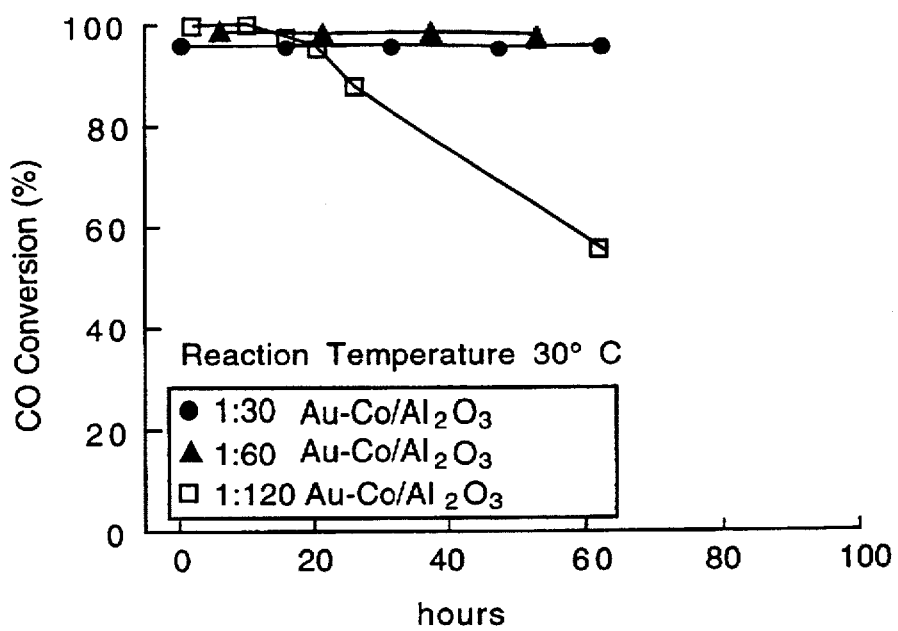

In a further experiment, the gold:cobalt atomic ratio of a gold:cobalt/alumina oxide catalyst was varied and the catalytic activity of each catalyst determined. The results are set out graphically in FIG. 4. It will be noted that best stability over a period of 60 to 70 hours was achieved with the catalyst using either a 1:60 gold:cobalt atomic ratio, or one with a 1:30 gold:cobalt atomic ratio.

In a further experiment, the ability of a catalyst of the invention to catalyse the oxidation of a hydrocarbon was evaluated. A Au—Co/$Al_2O_3$ catalyst was prepared using the method of Example 2. The gold concentration was 0.4 weight percent, with Au:Co of 1:60 (atomic ratio).

Hydrocarbon oxidation was evaluated after in-situ pretreatment of one gram of the catalyst in pure oxygen at 500° C. The conversion of hydrocarbon was based on the propylene ($C_3H_6$) concentration in the reactant and product gases, in accordance with generally accepted automotive catalyst testing procedures. The reactant feed consisted of 0.22% $C_3H_6$, 0.76% CO, 2.82% $CO_2$, in a mixture of excess oxygen and nitrogen.

The general hydrocarbon ("HC") oxidation reaction over the catalyst was observed to be:

"HC"+$O_2$→$CO_2$+$H_2O$

At a reaction temperature of 300° C. the following "HC" and CO oxidation activities were calculated, under the test conditions.

| TEMPERATURE (°C.) | HC OXIDATION (%) | CO OXIDATION (%) |
| --- | --- | --- |
| 300 | 98.6 | 99.3 |

We claim:

1. A catalyst for use in an oxidation reaction comprising a porous alumina support having captured thereon a complex comprising gold, a transition metal selected from cobalt and manganese, and the alumina, the concentration of gold on the support being less than 2 percent by mass of the catalyst, and the atomic ratio of gold to transition metal being in the range 1:30 to 1:200.

2. A catalyst according to claim 1 wherein the gold concentration on the support is in the range 0.1 to 0.5 percent by mass of the catalyst.

3. A catalyst according to claim 1 wherein the atomic ratio of gold to transition metal is in the range 1:30 to 1:80.

4. A catalyst according to claim 1 wherein the transition metal is cobalt and the complex includes oxidised cobalt and a spinel between the cobalt and the alumina, and gold atoms or particles are in intimate contact with the spinel and the oxidised cobalt.

5. A catalyst according to claim 1 wherein the alumina has a surface area in the range 80 to 400 $m^2/g$.

6. A catalyst according to claim 1 wherein the porous alumina support is in the form of a monolith, pellets, extrudates, rings or pearls.

* * * * *